Aug. 27, 1957  J. H. REAVES  2,804,606
PULSE HEIGHT ANALYZER SYSTEM
Filed May 14, 1956  3 Sheets-Sheet 1

INVENTOR
John H. Reaves
BY Arthur Vinograd
Leonard F. Stoll  ATTORNEY
AGENT

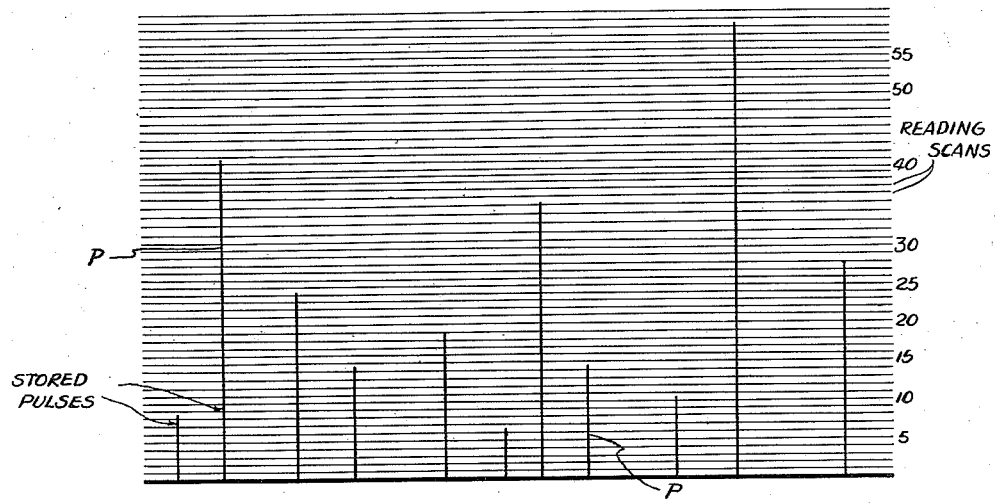
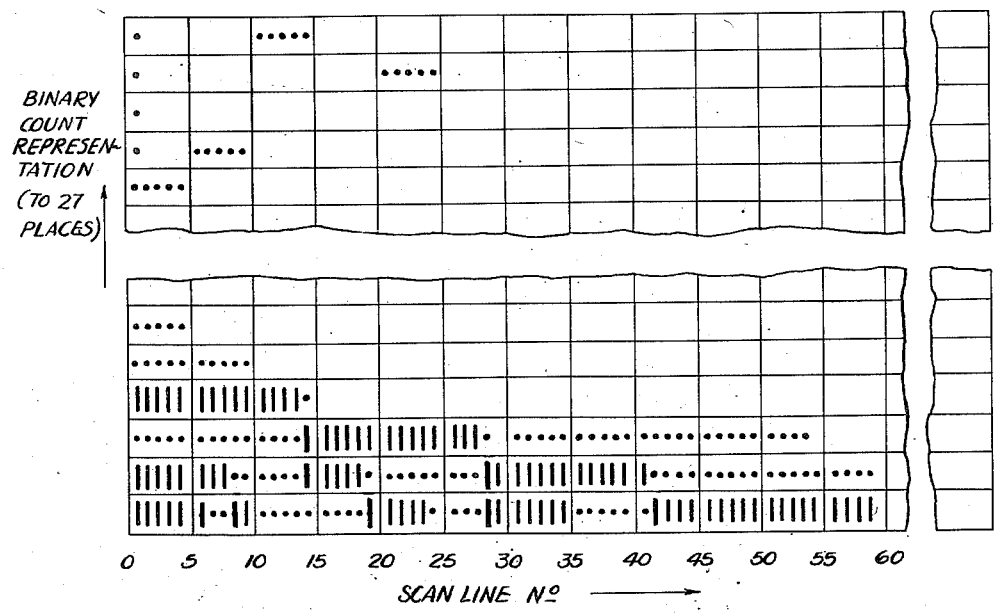

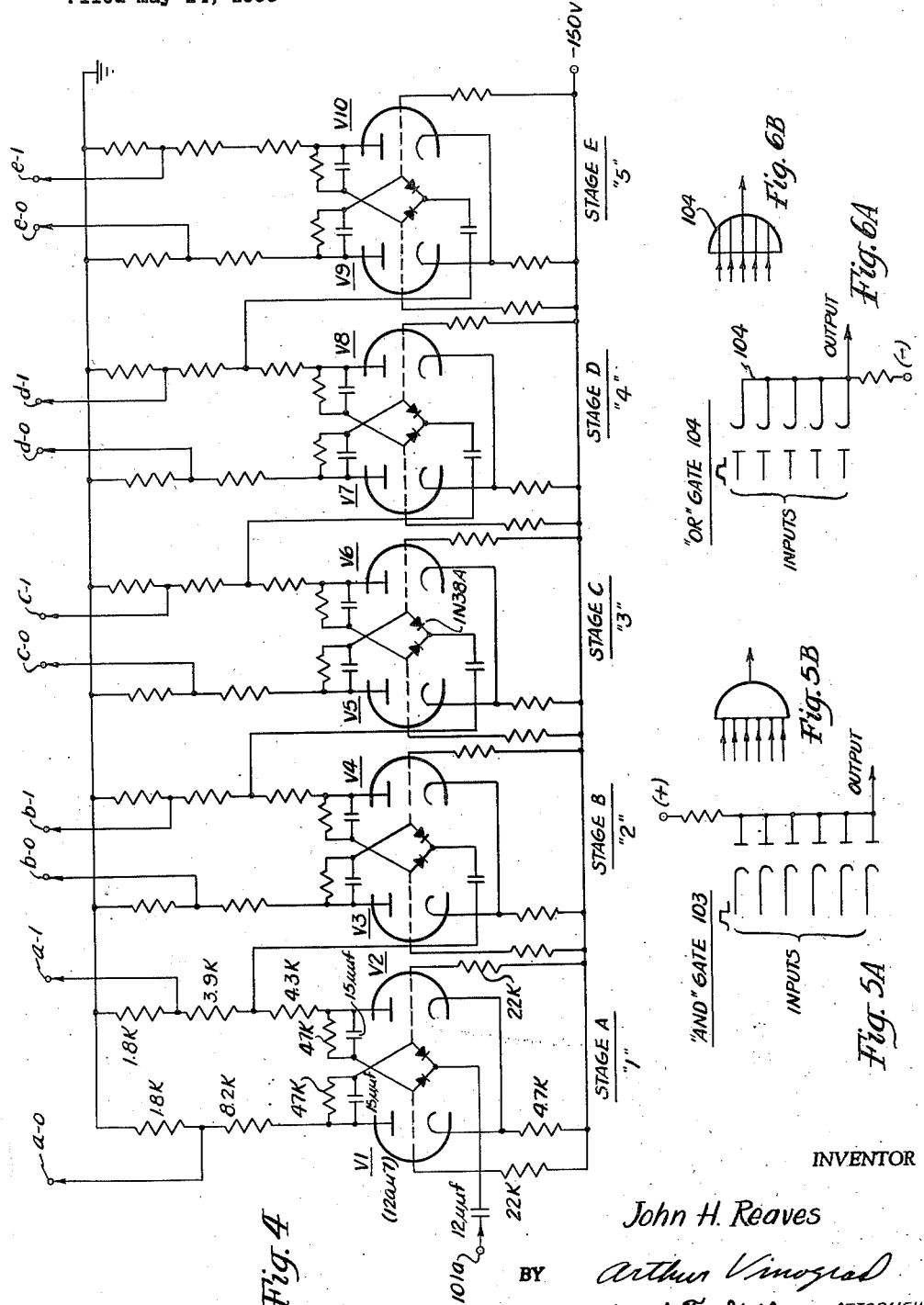

United States Patent Office 2,804,606
Patented Aug. 27, 1957

2,804,606

PULSE HEIGHT ANALYZER SYSTEM

John H. Reaves, McLean, Va., assignor to the United States of America as represented by the Secretary of Commerce Application May 14, 1956, Serial No. 584,867

10 Claims. (Cl. 340—213)

This invention relates to a multichannel pulse-height analyzer and is particularly adapted to analyze voltage pulses such as are encountered in investigations involving the use of high-velocity particle accelerators.

In accordance with known practices, such pulses are obtained during the short output duration of a particle accelerator such as the betatron or synchrotron, and it has therefore been found efficacious to memorize these voltage pulses and then analyze them during the dead time period between the output periods of the accelerator. This invention, however, is not necessarily limited for use in connection with the outputs obtained from high-energy particle accelerators, since the construction of the analyzer involves principles which singularly adapt it for use in analyzing pulses obtained from any desired source.

It is accordingly an object of this invention to provide a pulse-height analyzer which classifies one or more pulses into discrete amplitude components and which distributes such components into respective segregated amplitude channels.

Another object of this invention is to provide a multi-channel pulse height analyzer of the type described in which the component amplitudes of the analyzed pulses are totalized and represented as distributed counts according to a pattern corresponding to the binary system of notation.

Still another object of this invention is to provide a multichannel pulse-height analyzer in which the amplitude components may be manifested as a display in visual form.

Still another object of this invention is to provide a multichannel pulse-height analyzer in which the pulses to be analyzed are stored in a first storage device and logical circuit elements of conventional variety are employed to produce a summarized display of the respective amplitudes.

Other uses and advantages of the invention will become apparent upon reference to the specification and drawings in which:

Fig. 2 is a representation of a plurality of voltage amplitude pulses as they appear when registered on the face of a storage tube employed with this invention;

Fig. 3 is a representation of a typical amplitude-count distribution pattern as it would appear on the face of a display storage tube employed with the present invention;

Fig. 4 is a circuit diagram of a typical electronic counter employed in various mechanisms of this invention;

Figs. 5A and 5B are a circuit diagram and symbolic representation of a typical and-gate; and Figs. 6A and 6B are a circuit diagram and symbolic representation of an or-gate.

Figure 1:
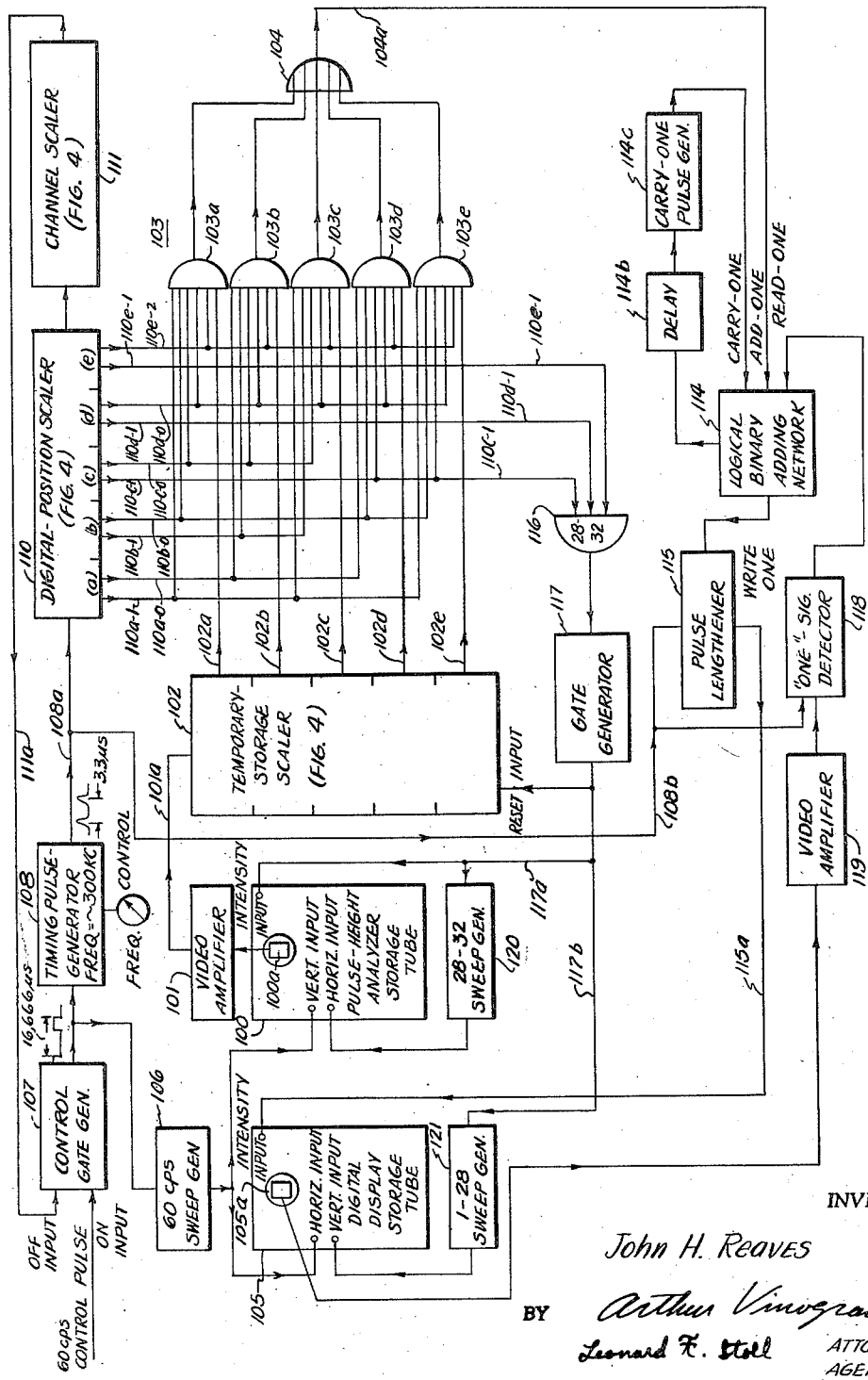
Fig. 1 is a schematic diagram showing the over-all organization of the apparatus of this invention.

In nuclear research utilizing betatron and synchrotron accelerators, for example, pulses of very short duration are obtained which, as explained in the copending application of James A. Cunningham, Serial No. 446,985, filed on July 30, 1954, now Patent No. 2,769,164, may be stored as amplitude pulses on the face of a suitable storage type of cathode-ray tube. Fig. 2 is a typical representation of a plurality of such pulses as they appear stored on the face of a storage tube. Fig. 2 shows eleven typical such amplitude pulses having different relative amplitudes as they would appear on the face of a pulse-height analyzer storage tube 100 symbolically depicted in Fig. 1. For simplicity, the circuits provided for "writing" the amplitude pulses to be analyzed are not shown. These pulses can be assumed to have been stored on the face of the tube in a conventional manner with a linear sweep supplying the horizontal deflection of the beam, and the pulses to be analyzed providing the vertical deflection. The "reading" circuitry associated with the storage tube 100 comprises a television-raster type of scan, and a conventional type of capacity coupling pick-up 100a. The scan lines representing the movement of the sweep beam of the cathode-ray storage tube is also indicated in Fig. 2 as a plurality of horizontal lines, each of which may be identified for descriptive purposes by a number reading upwardly from the bottom of the pattern as indicated in the right-hand side of Fig. 2.

As the scan lines in Fig. 2 show, each horizontal sweep of the beam in the storage tube 100 will intercept pulses having an amplitude at least equal to the vertical position of the particular scan line as measured from the bottom of the figure. For example, the first six scan lines will necessarily intercept eleven charge discontinuities created by each of the eleven stored pulse manifestations.

The number of charge discontinuities detected by the beam during each scan is tabulated in Table I below. As is apparent, scan lines numbered 7 through 8 in Fig. 2 will intercept ten charge discontinuities because, as is evidenced from Fig. 2, only ten of the stored pulses have an amplitude equal to or exceeding the vertical position of these scan lines. Similarly scan lines 9 and 10 will detect nine pulses, while lines 11–14 will intercept 8 pulses, etc., as indicated by the tabulation in the table.

TABLE I

| Scan Line Identification Number | No. Pulses Detected per Scan | Binary Representation of Pulses Detected by Each Scan (27 places) |
|---|---|---|
| 1–6 | 11 | 0 . . .1011 |
| 7–8 | 10 | 0 . . .1010 |
| 9–10 | 9 | 0 . . .1001 |
| 11–14 | 8 | 0 . . .1000 |
| 15–19 | 6 | 0 . . .0110 |
| 20–24 | 5 | 0 . . .0101 |
| 25–28 | 4 | 0 . . .0100 |
| 29–35 | 3 | 0 . . .0011 |
| 36–41 | 2 | 0 . . .0010 |
| 42–59 | 1 | 0 . . .0001 |

Table I also indicates the binary coded representation of the number of pulses detected during each scan.

A 27-place binary representation is employed in order to fully illustrate the capacity of the device as contemplated.

That is, while Fig. 2 is an illustration of the apparatus used to analyze eleven stored pulses, the present invention enables retention of counts up to 2 to the 27th or 134,217,727 per channel. It is also apparent that the capacity of the apparatus can be suitably increased to any desired degree within practicable limitations by increasing the number of digital positions employed in the coded representation.

Referring again to Fig. 2, each of the scan lines counting from the bottom upwardly can be said to represent a pulse height component or voltage amplitude level, since the beam in tracing such scan lines will sense any pulse having an amplitude which equals or exceeds the vertical position of such scan line. In this manner the vertical position of each scan line relative to the base line in Fig. 2 defines a particular discrete voltage amplitude level of predetermined magnitude, and the beam in executing each such trace line identifies the portion of each stored pulse having a corresponding voltage level component.

Fig. 3 shows a typical display produced by the apparatus of this invention as it would appear on the memory tube 105 forming part of the circuit shown in Fig. 1.

In Fig. 3 the abscissa corresponds to the scan line identification number representing an amplitude-component channel as discussed in connection with Fig. 2, while the ordinate corresponds to the binary representation (to 27 digital places) of the number of pulses having a corresponding voltage level detected by the pulse storage tube beam in executing each scan. That is, the number of charge discontinuities counted by the beam as it sweeps across the stored pulses in storage tube 100 (Fig. 2) in a particular scan line position is plotted in Fig. 3 in binary notation as an ordinate corresponding to that particular scan line plotted along the abscissa. In order words, referring to Table I which conveniently tabulates the various number of pulses counted by the beam for each scan line excursion, it will be apparent that scan lines or pulse height channels 1-6 will be indicated in Fig. 3 (reading from the bottom upward) as a dash dash dot dash dot dot etc. Similarly scan line 30, for example, will be indicated by a dash dash dot dot dot, etc. The term dash-dot is in accordance with the conventional nomenclature and is intended to represent a pulse no-pulse condition, respectively. The distributed count representation of Fig. 3 is implemented by the apparatus according to this invention as a visual display on the face of the digital memory tube 105 indicated in Fig. 1.

The display tube 105 operates in time-shared synchronism with the pulse storage tube 100 so that the counts detected during any given reading sweep by the beam in the storage tube are always added in a proper channel (scan line position) in the display tube. In this manner, each scan of the beam in storage tube 100 produces a number of pulses corresponding to the number of charge discontinuities sensed in the tube at a level corresponding to the vertical position of the scan line, and such detected pulses are, through the apparatus of this invention, written in conventional binary notation as a pattern of vertical dashes during a vertical sweep of the beam in the display tube 105, such vertical sweep being articulated with the horizontal scanning of the beam in storage tube 100.

Moreover, in accordance with the apparatus of this invention, as the reading beam in storage tube 100 is deflected vertically to the next scan line position defining a new voltage amplitude level, the writing beam in display tube 105 is displaced horizontally to a corresponding scan line or amplitude component channel number, but in alternate time sequence as will be made clear.

To acomplish the above results, the amplitude pulses stored in storage tube 100 are scanned and the resulting detected signals are amplified in a video amplifier 101 and then applied to temporary storage scaler 102 as shown in Fig. 1. Each horizontal sweep in the tube 100, as represented by each of the horizontal scan lines in Fig. 2, generates signals corresponding to the voltage level represented by the scan line, which are applied serially to the scaler 102.

The temporary storage scaler 102 is a conventional binary scaler consisting of five stages of bistable elements for storing a maximum count of 31. The output from video amplifier 101 is applied in serial fashion to the scaler 102 and a parallel output is obtained from each of the five channels as represented by the output leads 102a–102e in accordance with a pattern determined by the number of pulses applied. Upon completion of each scan, therefore, the parallel output leads 102a–102e will have been energized according to a pattern which is the coded binary representation corresponding to the number of the serially applied pulses.

The specific circuit construction of the binary scaler is shown in Fig. 4. The circuit is conventional and is of the general type described on pages 208 to 212 of "Electronics" by Elmore and Sands published by McGraw-Hill. The particular scaler 102 employs five bi-stable stages. This limits the number of pulses that can be analyzed in any one burst to $2^5-1$, or 31.

It will be apparent therefore that each time the cathode beam completes a scan corresponding to a path defined by one of the horizontal scan lines shown in Fig. 2, a number of pulses corresponding to the pulses P stored on the storage tube 100 intercepted by the beam will have been manifested on lead 101a in Fig. 1 and applied to the scaling circuit 102 detailed in Fig. 4. The scaling circuit of Fig. 4 will then function in characteristic manner to provide parallel output signals on the terminals 102a–102d according to a pattern determined by the number of pulses applied at terminal 101a during each horizontal H-scan. Accordingly, upon completion of each scan in the storage tube 100, the scaler 102 will have, in effect, memorized in binary coded form the number of pulse components detected by the sweeping beam having an amplitude level corresponding to that defined by the vertical position of the beam.

The output leads 102a–102e of the temporary storage scaler 102 are connected to a digital position and-gate complex 103 comprising a plurality of and-gates 103a–103e as indicated in Fig. 1. The and-gates are of conventional construction and may be of the type fully described in an article entitled "Dynamic Circuit Techniques Used in SEAC and DYSEAC" by Elbourn and Witt appearing in "Proceedings of the I. R. E.," vol. 40, No. 10, October 1953, pages 1380–1383. The circuit of a typical such and-gate comprising the gate complex 103, together with the symbolic representation therefor, is shown in Figs. 5A and 5B, while an or-gate 104 is detailed in Figs. 6A, 6B. Each of the and-gates 103 functions to provide an output when, and only when, there is a coincidence of positive pulses on all of the inputs; the or-gate 104 provides an output signal when any one of its inputs is energized with a positive signal.

As is apparent from Fig. 1, the and-gate complex 103 may preferably comprise five and-gates 103a–103e of the type shown in Figs. 5A, 5B, and each such gate is provided with six separate inputs. The sixth input to each and-gate comprises one of the referred-to outputs from the temporary storage scaler 102 as manifested on leads 102a–102e, respectively. The remaining five inputs to each and-gate are obtained sequentially from a digital position scaler 110 to be described.

As will become apparent in the further description of the invention, since an output can be obtained from each and-gate only upon coincidence of the six applied input signals, the application of five "digital position" pulses obtained from the digital position scaler 110 together with a sixth pulse from storage scaler 102 will provide an output signal which in effect identifies the time-sequence position and the presence of an output signal from the particular stage of the storage scaler. As will be explained, the referred-to time-sequence positions in effect correspond to discrete successive time periods with which the vertical sweep of the display tube 105 and the horizontal sweep of the storage tube correspond, and the digital position scaler 110 therefore functions as a commutating device to transfer the amplitude components detected in storage tube 100 in converted coded form as itemized indications in the display tube 105.

Digital position scaler 110

The referred-to digital position scaler 110, which cooperates with the temporary storage scaler to determine the sequence of energization of the gates 103, comprises a 5-stage binary scaler similar in circuit construction to the temporary-storage scaler detailed in Fig. 4 but includes an output such as 110a–1, 110a–0, —110e–1—110e–0 from each half of each bi-stable stage, as indicated in Fig. 1.

The digital position scaler 110 is serially energized by a timing-pulse generator 108 and delivers output signals through the referred-to leads 110a–0, 110a–1, 110b–0, 110b–1, etc. to specified inputs to the and-gates 103. The designations 110a–1, 110a–0, etc. indicate the respective "1" and "0" outputs obtained from each stage of the binary counter.

As will become apparent as the description proceeds, the entire system is precisely time controlled according to time intervals of 16,666 μs. periods, each of which is initiated by a control gate generator 107 in response to 60 C. P. S. initiating control pulses as indicated in Fig. 1. Such pulses turn on the timing pulse generator 108 which operates at a frequency of 300 kc. and provides 3.3 μs. time-spaced timing pulses for operating the digital position scaler 110. Since such timing pulses are applied serially to the scaler 110 as described, the parallel output leads 110a–110e will be energized each 3.3 μs. period in sequence according to a different respective binary pattern, the effect of which is to "ready" in sequence each of the and-gates 103a–103e, comprising the gate complex 103.

Specifically, the various stages of the scaler 110, shown in Fig. 4, will be energized according to the following pattern by the referred-to serially applied timing pulses.

| Applied Pulse | Tubes Energized | | | | | Output Lead Energized to Provide a Positive Pulse | | | | |
|---|---|---|---|---|---|---|---|---|---|---|
| 1 | V1 | V4 | V6 | V8 | V10 | a-1 | | | | |
| 2 | V2 | V3 | V6 | V8 | V10 | a-0 | b-1 | | | |
| 3 | V1 | V3 | V6 | V8 | V10 | a-1 | b-1 | | | |
| 4 | V2 | V4 | V5 | V8 | V10 | a-0 | b-0 | c-1 | | |
| 5 | V1 | V4 | V5 | V8 | V10 | a-1 | b-0 | c-1 | | |
| 6 | V2 | V3 | V5 | V8 | V10 | a-0 | b-1 | c-1 | | |
| 7 | V1 | V3 | V5 | V8 | V10 | a-1 | b-1 | c-1 | | |
| 8 | V2 | V4 | V6 | V7 | V10 | a-0 | b-0 | c-0 | d-1 | |
| 9 | V1 | V4 | V6 | V7 | V10 | a-1 | b-0 | c-0 | d-1 | |
| 10 | V2 | V3 | V6 | V7 | V10 | a-0 | b-1 | c-0 | d-1 | | and so forth.

It will be clear from the above description that the scaler 110 acts as a commutator to sequentially ready each of the and-gates 103a–103e in succession at 3.3 μs. intervals occurring within each 16,666 μs. main cycle period. If at the time each of the and-gates is readied in such manner, a dash signal should be manifested in any one of the parallel output leads 102a–102e from temporary storage scaler 102, then there will exist a coincidence of the six referred-to signals applied to such gate and the gate will conduct. In other words, the gate complex 103 can be said to recognize the existence of a dash representing a signal at a particular time position corresponding to the sequence of energization of a particular one of the and-gates 103a–103e. For example, a concurrence of output signals obtained on leads 110a–1, 110b–0, 110c–0, 110d–0, and 110e–0, of the scaler 110 and lead 102a from the temporary storage scaler 102 can be interpreted to mean that in a position designated as 1 by the digital position scaler 110, there is a binary dash signal representation in the coded number then existing in the scaler 102 after the reading beam has scanned across the storage tube 100 in scan line position 1. Similarly, as the scaler 110 commutates into readiness the and-gate 103b, a concurrent signal on lead 102b indicates that in position 2 there is a binary dash representation in the coded number then existing in scaler 102.

The stages of the digital position scaler 110 in this manner identify the successive binary digital positions indicated as the ordinate in Fig. 3 and dictates whether or not a binary dash should be written in such position on the memory tube 105. Each such digital position designation, as previously described, corresponds to a predetermined amplitude component category and because the horizontal sweep of the storage tube 100 is also controlled by the scaler 110 as will be described, the detected pulse amplitude components will always be indicated in display tube 105 in a horizontal position reserved for pulses having a corresponding amplitude category.

Any of the (dash) pulses which are obtained in such manner are applied through or-gate 104 to a logical binary adding network indicated as 114 in Fig. 1. The network 114 is a conventional binary adder and may be of a type commercially produced by the Computer Control Company of Wellesley, Mass., and described on page 10 of their pamphlet entitled "Symbolic Logic, Binary Calculation, and 3C–PACS," by Robert W. Brooks. Briefly, such portion of the apparatus will function in accordance with the following logical rules: (1) Carry "one" when any two or all three of three signals are present and (2) write "one" when one or three of three signals are present. The three referred-to signals comprise: (1) The add "one" signal representing the previously described output from or-gate 104, (2) the carry "one" signal generated by the binary adding network when a carry "one" situation exists, and (3) a read "one" signal, which results when the scanning beam in the display tube 105 has detected a previously written dash, and which is applied through an amplifier 119 and coincidence gate 118 to the binary adding network as indicated in Fig. 1.

The significance of the add "one" signal from or-gate 104 has already been described. This is, it defines in what position of the scanning beam a dash corresponding to a digit of a binary representation should be added.

The significance of the carry-one signal is self-explanatory since it represents the carry resulting from adding at least two binary "ones" together. The carry-one signal is properly "shifted" by a delay element 114b in a conventional manner and applied to the adder mechanism by a carry-one pulse generator 114c.

The read-one signal is derived from the pattern previously stored in the digital memory display tube 105 as a result of a previous analyzing cycle and detected by means of a pick-up electrode 105a. That is, referring to Fig. 3, the existence of a dash in any digital position due to a previously stored "1" generates a read-one signal when scanned, and such signal is applied to the adding network 114 and combined with the referred-to add and carry signals so that the information stored in display tube 105 always corresponds to the current total of amplitude components which have been determined.

The output from the adding network 114 is applied to a pulse lengthener or stretcher 115, which generates a signal having a duration sufficient to write a dash pulse in the memory tube 105. The pulse lengthener 115 is clock-controlled from the timing generator 108 through lead 108b so as to synchronize the time of writing information in display tube 105 with the action of the previously described portion of the mechanism. The pulse lengthener may be in the form of a univibrator of the type described on page 88 of "Electronics" by Elmore and Sands published by McGraw-Hill. In this manner, at a period determined by the timing pulse generator 108, a write-one pulse (if one exists) will be applied to the input of memory tube 105 by conductor 115a, where it will be written as a dash in an appropriate position on the screen as indicated by the pattern of Fig. 3.

Both the horizontal deflection sweep for storage tube 100 and the vertical deflection sweep for display tube 105 are clock-pulse controlled in time sequence so that the incremental positions of the former beam while tracing one of the horizontal scan lines (Fig. 2) will be correlated with the incremental positions of the vertically deflected beam in tube 105 as it is displaced in the abscissa direction as indicated in Fig. 3. Because of such articulation between the pulse-sensing beam in tube 100 and the information writing beam in tube 105, the time position in which a pulse is determined to exist in the memory device 102 will correspond to the time position in which a corresponding pulse is written in display tube 105.

Such control is effected by the 28–32 and-gate 116, the output of which controls the horizontal sweep for storage tube 100 by means of the 28–32 sweep generator 120 and the vertical deflection circuit of display storage tube 105 by means of a corresponding 1–28 sweep generator 121. The output of 28–32 and-gate 116 provides a rectangular wave having two transitions occurring at the beginning of the 28th and 32nd digital positions as determined by the digital-position scaler 110 to which the and-gate is connected. It will be noted from Fig. 1 that output leads 110c–1, 110d–1, and 110e–1 from stages 110c, 110d, and 110e of the scaler 110 are connected to the input of and-gate 116. By following through the mode of operation of the binary scaler 110 previously described, it will be apparent that all the above output leads will be positively energized on counts corresponding to decimal numbers 28, 29, 30, and 31. In this manner the and-gate 116 provides an output signal to gate generator 117 at time intervals defined by timing pulse counts of 28 and 32. Since the timing pulses are 3.3 $\mu$s. apart, the time interval defined by the referred-to transition points of the square wave equals 4×3.3 or 13.2 $\mu$s. Accordingly, the 28–32 sweep generator 120 which provides the horizontal sweep for storage tube 100 is triggered to conduction by the rising portion of the square wave and will be energized for a 13 $\mu$s. period, which interval therefore defines the duration of each horizontal scan.

The output of the gate generator 117 is also applied through conductor 117b to a 1–28 sweep generator 121 as indicated in Fig. 1 comprising the vertical sweep circuit for display storage tube 105. The 1–28 sweep generator 121 is initiated by the trailing edge of the square wave, and will be energized for a period corresponding to 28×3.3 or 93 $\mu$s., an interval defining the duration of each vertical sweep of the display storage display tube 105.

Initiation of both of the referred-to horizontal and vertical sweeps is therefore precisely time related to energization of the and-gate 116, which sequentially initiates the horizontal pulse-scanning sweep in tube 100 and the vertical sweep in tube 105. In this manner it is assured that all of the information read by the beam in scanning tube 100 will, after conversion in the portion of the apparatus comprising the elements 102, 110, 103, and 114, be manifested as energizations of the writing beam in tube 105 in horizontal positions corresponding to the vertical position of the scanning beam in tube 100.

It has been previously mentioned that the control pulses initiate the action of the apparatus at 16,666 $\mu$s. periods. For such purpose a channel scaler 111 is provided as shown in Fig. 1 between the output of the digital-position scaler 110 and the control gate generator 107. The channel scaler 111 is similar in construction and operation to the circuit shown in Fig. 4 but includes seven bi-stable stages to provide a count of $2^7$ or 128 which corresponds to 32×128 or 4096 cycles from the timing pulse generator. The output signal is obtained on the 128th count of the scaler 111 is fed back through conductor 111a to cut off the control gate generator 107 and thereby terminate a period of operation. The next input control pulse again turns on the gate generator, causing the above sequence to be repeated.

It will be apparent from the above description that the number of pulse-height components of particular amplitude sensed by the scanning beam in storage tube 100 is memorized as coded information in the temporary scaler 102. The pulses from timing-pulse generator 108 determine the sequence of energization of the gates 103a–103e and the duration of the horizontal scanning sweep. As previously indicated, the vertical sweep for the display storage tube 105 is also controlled by these timing pulses through scaler 110, but the sweep generator 121 which controls such sweep is initiated during the portion of the cycle following completion of the horizontal scanning sweep in tube 102. Accordingly, the vertical sweep of the beam in tube 105 is sandwiched in timewise with respect to the horizontal sweep in tube 100. Such alternate scanning operations take place in sequence and are repeated for each scaleline shown in Fig. 2 until a complete raster has been scanned. The present invention contemplates a 128-line raster and hence the timing-pulse generator 108 is arranged to be driven for 4096 cycles of oscillation (32×128) after which it is turned off by the control gate generator 107 in response to a signal from the channel scaler 111 as previously described. The beam in the display storage tube 105 will also sense previously written binary information which has been stored on the screen of the tube as a result of a preceeding scanning operation. That is, upon completion of any scan line in Fig. 2, the corresponding channel in storage tube 105 (Fig. 3) will be inscribed with a number of dashes representing the total count in coded binary form of the number of amplitude components detected by the scanning beam in this raster and all preceding such rasters. During the vertical sweep in tube 105 the beam will detect previous binary pulses by means of the captavitive pick-up 105a, and the resulting information will be applied to the referred-to adder circuit 114 to produce a new and current total of the count information to be written back into the storage tube 105 in the same channel. Hence upon completion of a large number of 16,666-$\mu$s.-cycle periods there will be displayed in the storage tube 105 a pattern of stores information representing a statistical summary of the total number of amplitude components of predetermined magnitude comprising the pulses originally stored in the storage tube 100.

It will be apparent that the embodiments shown are only exemplary and that various modifications can be made in construction and arrangement within the scope of the invention as defined in the appended claims.

What is claimed is:

1. A pulse-height analyzer for resolving stored pulses into component amplitude categories comprising means defining a predetermined discrete amplitude level for sensing respective portions of the stored pulses existing at said amplitude level, means for memorizing the number of said sensed portions as coded information, signal storing means having a plurality of storage channels corresponding respectively to said predetermined discrete amplitude categories, commutating means for sequentially interrogating said memorizing means, and means responsive to the information indicated in said signal storing means and to said commutating means for sequentially energizing said channels to register respectively the current cumulative total of said discrete amplitude levels.

2. The invention of claim 1 including a source of timing pulses and means connecting said source to said sensing means and said commutating means respectively.

3. The invention of claim 1 in which said channel-energizing means comprises means for combining the information in said signal-storing means and said sensed coded information.

4. A pulse-height analyzer for resolving pulses stored in a cathode-ray storage tube as charged store areas into component amplitude categories comprising: a first sweep circuit for causing the storage tube beam to repetitively scan across the store areas, a second sweep circuit for displacing the beam in equally spaced increments in a direction perpendicular to said direction of scan, means for detecting the voltage signals generated by the beam in intercepting said store areas, means responsive to said detecting means for memorizing the number of detected signals consequent to each scan in coded form, a second storage tube for displaying signals in like coded form as a pattern of charged areas, one deflection circuit of said display tube being connected to said second sweep circuit for causing the display tube beam to be deflected synchronously with the corresponding displacement of the beam in said first storage tube, a third sweep circuit for deflecting said display tube beam in a direction corresponding to said scanning movement, means on said display tube for detecting signals generated by its beam in intercepting said patterns of charged areas, commutating means for sequentially interrogating said memorizing means, and means jointly responsive to said commutating means and said last-mentioned detecting means for energizing the display tube beam.

5. The invention of claim 4 including a source of timing pulses connected to said commutating means, and control means connecting said commutating means to said first and third sweep circuits for initiating the sweep of the respective storage tubes in time sequence.

6. The invention of claim 4 in which said memorizing means comprises an n-stage binary scaler for registering the number of detected voltage signals consequent to each scan as a pattern of energized stages, and said commutating means comprises means for determining in time sequence the state of energization of each stage.

7. The invention of claim 6 in which said commutating means comprises a second n-stage binary scaler, a plurality of coincidence gates, a source of timing pulses for sequentially energizing said second scaler stages according to characteristic patterns corresponding to the applied number of timing pulses, and a matrix circuit connecting each stage of said first binary scaler in consecutive order to a separate one of said coincidence gates respectively, and connecting one output from each of said second binary scaler stages to each of said coincidence gates.

8. The invention of claim 7 in which the outputs of said coincidence gates are connected in common to said jointly responsive means.

9. The invention of claim 8, including control means responsive to said second-mentioned scaling circuit for deenergizing said timing-pulse source upon completion of a predetermined time period.

10. The invention of claim 9 in which said control means comprises a multistage binary scaler providing a control pulse upon completion of a predetermined count of pulses applied thereto and means for applying said control pulse to said timing-pulse source.

References Cited in the file of this patent

UNITED STATES PATENTS

| | | |
|---|---|---|
| 2,465,355 | Cook | Mar. 29, 1949 |
| 2,700,151 | Flory | Jan. 18, 1955 |
| 2,745,985 | Lewis | May 15, 1956 |